(12) United States Patent
Shah et al.

(10) Patent No.: US 11,426,787 B2
(45) Date of Patent: Aug. 30, 2022

(54) ROBOTIC WEIGHT MACHINE

(71) Applicant: INTERNATIONAL WHEEL & TIRE COMPANY, Farmington Hills, MI (US)

(72) Inventors: Harsh Suresh Shah, Farmington Hills, MI (US); Netresh U. Rege, Novi, MI (US); Erik Lance Kirk McClain, Livonia, MI (US); Mohamad Dib Kassem Hassan, Dearborn Heights, MI (US); Todd Allen Campbell, LaSalle, MI (US); Keith Martin Smiley, Lake Orion, MI (US); Kevin Douglass Smiley, Oxford, MI (US); Daniel Jonathan Ehlke, Detroit, MI (US); Joseph A. Lopetrone, Warren, MI (US)

(73) Assignee: INTERNATIONAL WHEEL & TIRE COMPANY, Farmington Hills, MI (US)

( * ) Notice: Subject to any disclaimer, the term of this patent is extended or adjusted under 35 U.S.C. 154(b) by 262 days.

(21) Appl. No.: 16/588,340

(22) Filed: Sep. 30, 2019

(65) Prior Publication Data
US 2021/0094089 A1    Apr. 1, 2021

(51) Int. Cl.
| | |
|---|---|
| *B25J 17/00* | (2006.01) |
| *B25J 17/02* | (2006.01) |
| *B25J 18/00* | (2006.01) |
| *B21J 13/10* | (2006.01) |
| *B25J 9/02* | (2006.01) |
| *B25J 13/08* | (2006.01) |
| *B25J 15/00* | (2006.01) |

(52) U.S. Cl.
CPC .............. *B21J 13/10* (2013.01); *B25J 9/02* (2013.01); *B25J 13/085* (2013.01); *B25J 15/0019* (2013.01)

(58) Field of Classification Search
CPC ....... B25J 15/0019; B25J 11/00; G01M 1/326
See application file for complete search history.

(56) References Cited

U.S. PATENT DOCUMENTS

| | | | | | |
|---|---|---|---|---|---|
| 8,182,639 | B2* | 5/2012 | Donnay | ................ | F16F 15/345 |
| | | | | | 156/281 |
| 8,561,464 | B2* | 10/2013 | Peinelt | .................. | G01M 1/326 |
| | | | | | 73/470 |
| 9,482,310 | B2* | 11/2016 | Donnay | ................ | F16F 15/345 |
| 10,914,359 | B2* | 2/2021 | Xu | ........................... | F16F 15/34 |
| 2010/0147458 | A1* | 6/2010 | Donnay | ................ | F16F 15/345 |
| | | | | | 156/281 |
| 2011/0226055 | A1* | 9/2011 | Rogalla | .................. | G01M 1/32 |
| | | | | | 73/468 |

* cited by examiner

*Primary Examiner* — Jake Cook
(74) *Attorney, Agent, or Firm* — Brooks Kushman, P.C.

(57) ABSTRACT

A robotic press assembly configured to apply force to a wheel, may include a selectively moveable arm that is operatively connected to a body portion at a first end thereof; and a press tool operatively connected to a second end of the moveable arm; wherein the press tool includes at least one mounting bracket maintaining a press tool thereon, the mounting bracket arranged on a platform, and a base operatively connected to the second end of the arm, the platform being slidably fixed to the base in order to adjust the lateral displacement of the press tool, and wherein the press tool is configured to apply force at the wheel.

19 Claims, 8 Drawing Sheets

ROBOTIC WEIGHT MACHINE

TECHNICAL FIELD

The present disclosure relates generally to wheel/tire assemblies and more specifically to a robotic weight press machine for use in a weight apply operation of a wheel/tire assembly process.

BACKGROUND

Rotating elements are used in many different applications, including, for example, automotive applications. Any weight imbalance in rotating elements may result in undesirable vibration. In the automotive industry, for example, such vibration can undesirably impact wear on vehicle components or create a poor vehicle driving experience for riders in a vehicle. To avoid these issues, it is known to subject rotating elements to a balancing operation.

Once the points for applying weight material have been identified, individual weight segments may be applied in a weight apply operation. The individual weight segments typically include an integrated adhesive backing or other arrangement for adhering the weights to an inside surface of a wheel.

SUMMARY

A robotic weight press assembly configured to press weights to a wheel, may include a selectively moveable arm that is operatively connected to a body portion at a first end thereof; and a press tool operatively connected to a second end of the moveable arm; wherein the press tool includes at least one mounting bracket maintaining a press tool thereon, the mounting bracket arranged on a platform, and a base operatively connected to the second end of the arm, the platform being slidably fixed to the base in order to adjust the lateral displacement of the press tool, and wherein the press tool is configured to apply force at the wheel.

A robotic weight press assembly configured to press weights to a wheel, may include a pneumatic cylinder having a piston rod configured to laterally translate with respect to a cylinder; a support element fixed to the piston rod; and a press tool operably arranged on the support element to apply force to the weights on the wheel.

A robotic weight press tool configured to press weights to a wheel, may include at least one mounting bracket maintaining a press tool thereon, the mounting bracket arranged on a platform, and a base operatively connected to the platform, the platform being attached to a sensor, and wherein the press tool is configured to apply force at the wheel.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Disclosed herein is a robotic weight press system configured to aid in adhering weights to the inside of a wheel. A weight press tool may be arranged on a robotic arm and may rotate a press tool around the interior of a wheel in order to further press the weights onto the inside of the wheel. The press tool may apply a force to the weights. The amount force applied may be determined by receiving data indicative of the force. By receiving an indication of the force, the robotic weight press system ensures a more accurate and uniform press of the weights.

Figure 1:
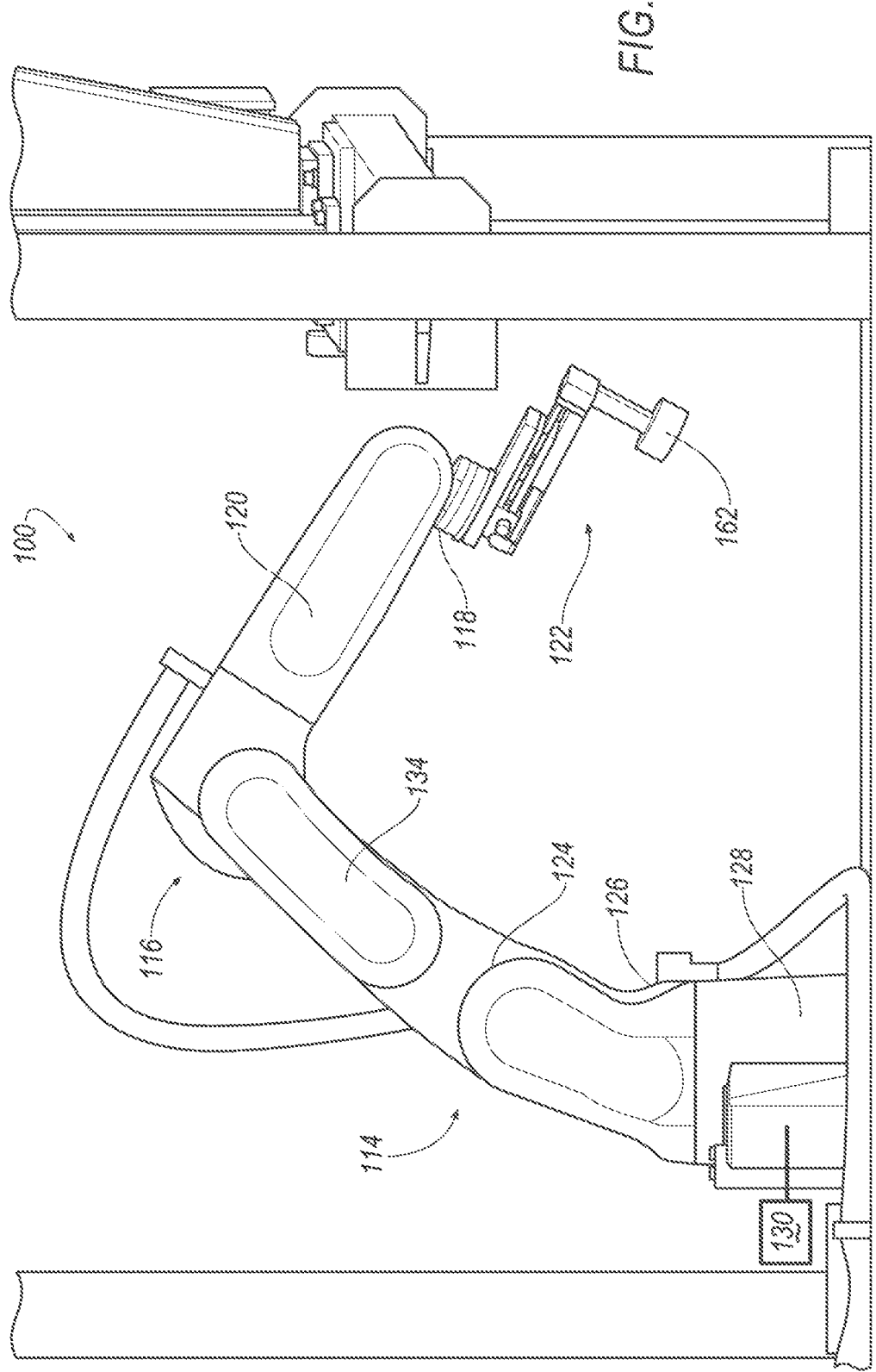
FIG. 1 illustrates a side elevational view of an exemplary robotic weight press system.

FIG. 1 illustrates a side elevational view of an exemplary robotic weight press system 100. The robotic weight press system 100 may include a robot having at least a first articulated joint 114, a second articulated joint 116, and a wrist 118. An arm 120 is positioned between the second articulated joint 116 and the wrist 118. A weight tool 122 is selectively attachable to the wrist 118 of the robotic weight press system 100. Details of the weight tool 122 will be described in further detail below with respect to FIGS. 2-13. A controller 130 may be operatively connected to the robotic weight press system 100 to control its operation. The controller 130 may also be configured to determine a certain pressing force applied to an inner wheel during operation. Further details are discussed below.

The second articulated joint 116 is mounted to a body portion 124 that is operatively connected to a foot member 126 via the first articulated joint 114. The foot member 126 is connected to a base portion 128. In one exemplary arrangement, the foot member 126 is rotatably-connected to the base portion 128 such that the foot member 126 may be pivoted relative to the base portion 128. This pivoting motion allows for the body portion 124 and arm 120 to be pivoted with respect to the base portion 28. Further, the body portion 124 is also hingedly connected to the foot member 1126 such that the body portion 124 may be articulated vertically relative to the base portion 128.

In one exemplary embodiment, the arm 120 may be connected to the body portion 124 such that the arm 120 may be articulated in any desirable upward or downward position relative the body portion 124. In one example, though not specifically labeled, the body portion 124 may include a yoke member that defines a channel between opposing wall members. An end portion of the arm 120 is disposed within the channel and pivotally attached thereto at second articulated joint 116.

The foot member 126 may also include a yoke member that defines a channel between opposing wall members. An end portion of the body portion 124 is disposed within the channel and pivotly attached thereto at the first articulated joint 114.

Mounted to the wrist 118 is a weight press device 122. Details of the wrist 18 and weight press device 122 are be discussed in greater detail in connection with FIGS. 2-13. The wrist 118 includes a moveable canister (not specifically labeled) into which a movable mount element is positioned. The wrist 118 may control a rotational movement of the weight press device 122. The weight press device 122, during operation, may be placed inside a tire. A press tool 162 of the weight press tool may abut the inside of the wheel to further press weights thereon. The wrist 118 may rotate the weight press device 122 around the inside radius of the wheel so that the press tool 162 comes into contact with the wheel in a uniform and fluid motion. The press tool 162 may be made of a soft urethane material. The press tool 162 may define a surface area that is larger than the respective weights it is pressing. In one example, the press tool 162, in a single swipe around the interior of the tire, may cover approximately 40% of the interior tire surface. The weights, also called chicklets, met cover approximately 20% of the interior tire surface. While the process described pressing or applying force to an interior of the wheel herein, the press tool 162 may be applied to other areas of a wheel include the top, sides, bottom, exterior portions, etc.

The controller 130 may be configured to receive feedback from the weight press device 122 to determine a force applied to the inside of the wheel by the press tool 162. This feedback may be received from a sensor (not shown in FIG. 1) and may be used to determine a displacement of the press tool 162. The displacement may then be used to determine the force.

The controller 130 may be a stand-alone device that includes a combination of both hardware and software components and may include a processor configured to analyze and process data received from the weight press device 122. The controller 130 may also be configured to provide instructions to the robot and the various elements thereof, including the wrist 118 and weight press device 122, as well as the other body portion 124, foot member 126, etc.

The controller 130 may include one or more processors configured to perform instructions, commands and other routines in support of the processes described herein. Such instructions and other data may be maintained in a non-volatile manner using a variety of types of computer-readable storage medium. The computer-readable medium (also referred to as a processor-readable medium or storage) includes any non-transitory medium (e.g., a tangible medium) that participates in providing instructions or other data that may be read by the controller 130 or processor. Computer-executable instructions may be compiled or interpreted from computer programs created using a variety of programming languages and/or technologies, including, without limitation, and either alone or in combination, Java, C, C++, C #, Objective C, Fortran, Pascal, Java Script, Python, Perl, and PL/SQL. The system may specifically implement and use a combination of TP programming (Teach Pendant programming) and Karel.

Figure 2:
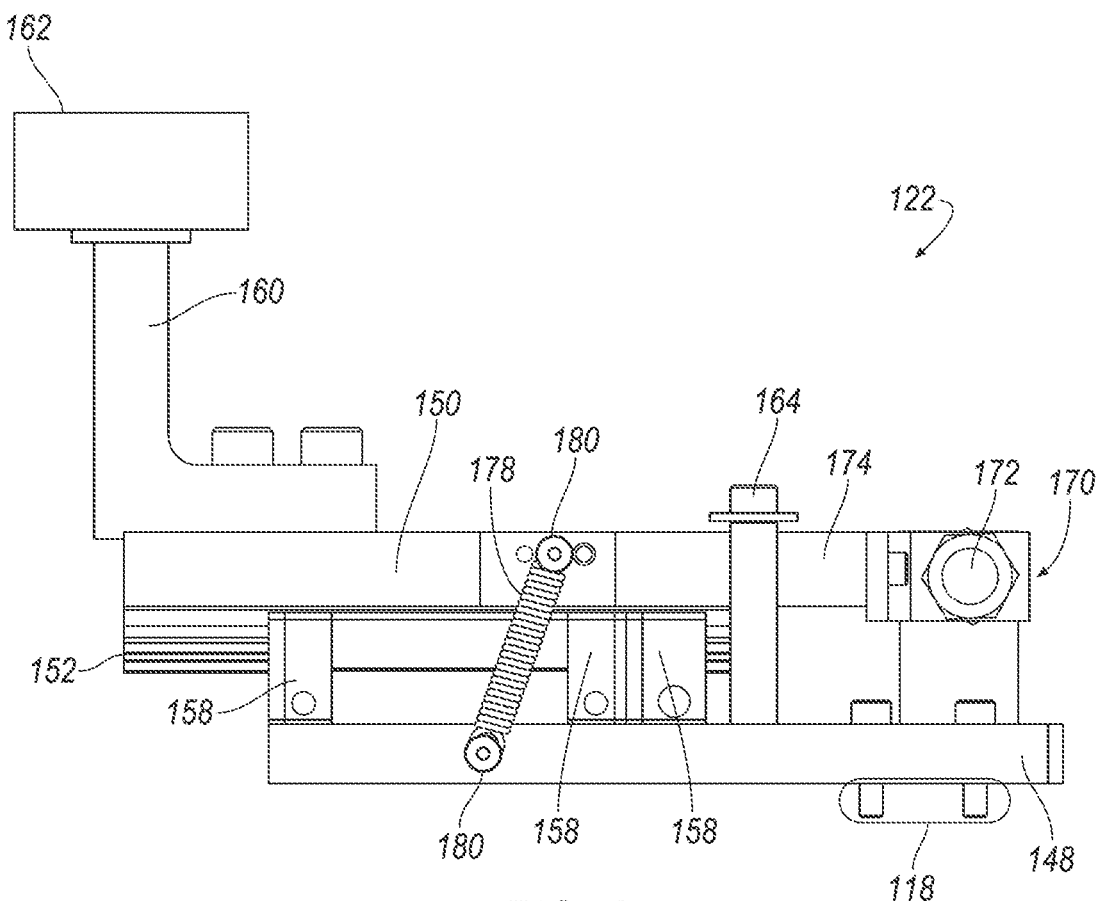
FIG. 2 illustrates a side view of the weight press tool of FIG. 1, the weight press tool being in an extended state.
Figure 3:
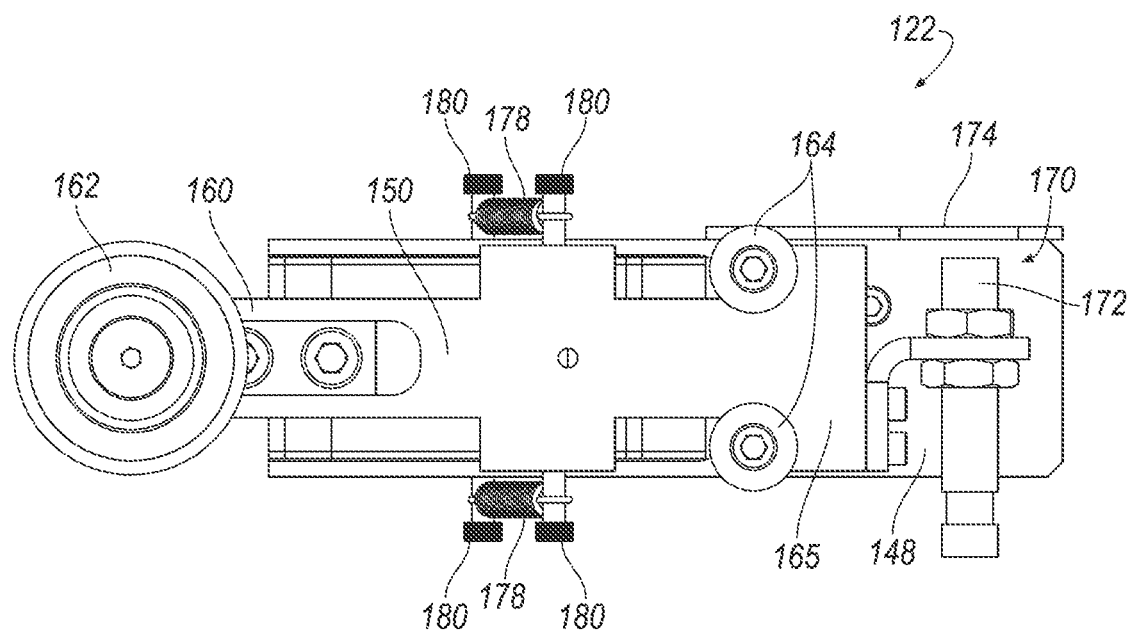
FIG. 3 illustrates a top view of the same position of the weight press tool as FIG. 2.

FIG. 2 illustrates a side view of the weight press device 122 of FIG. 1, the weight press tool being in an extended state. The extended state may relate to the tool 122 being in a resting state. This may be the normal state when the tool 122 is not in use. FIG. 3 illustrates a top view of the weight press device 122 of FIG. 2. The weight press device 122 may include a base 148 configured to operably attach to the wrist 118. The base 148 may be mounted to the wrist 118 via a mounting bracket, bolt, screw, or other attachment mechanism. In one example, the base 148 may be removable from the wrist 118 allowing the weight press device 122 to be selectively removable from the wrist 118.

The weight press device 122 may include a platform 150 configured to extend generally parallel to the base 148. The platform 150 may include a guide rail 152 arranged on one side of the platform 150 adjacent to the base 148. The base 148 includes at least one linear guide 158 fix thereto and extending therefrom to receive the guide rail 152. Additionally or alternatively, the guide rail 152 may be arranged on the base while the linear guide 158 may be arranged on the platform 150.

The linear guide 158 may be configured to receive the guide rail 152 of the platform 150. The rail 152 may be laterally movable within the track such that the platform 150 may translate between an extended state, or resting state, to a retracted state. The amount of displacement may correlate to a level of force being applied by the press tool 162 to the inside of the wheel.

The platform 150, as best seen in FIG. 3, may form an I-shape such that two reciprocal notches are arranged in or about the middle thereof, though other shapes and forms may be used. A support element 160 may extend from a distal end of the platform 150. The support element 160 may form an "L-shape" and be attached to the platform 150 via at least one bolt. The support element 160 may extend perpendicular to the platform 150 and carry the press tool 162 attached to a distal end thereof. The support element 160 may extend at an angle from the platform 150 other than the 90 degree angle depicted in the Figures. The support elements 160 may form any other shape, and is not limited to an L-shape.

The press tool 162 may be configured to rotate about the support element 160 in order to apply a force to the inside of the wheel to further press weights onto the wheel (not shown in FIG. 1). The press tool 162 may be friction driven to extend around the inside of the wheel and apply force to the weights. The weights may not move from their fixed position during the pressing. While the press tool 162 is shown as a bearing-type mechanism, the roller 162 may include non-rotatable elements such as a plate, wipe, weight applicator, etc., configured to apply force at the inside of the wheel. Furthermore, the press tool 162 may be configured to provide for other functions such as cleaning, add weights, etc.

The ultimate position of the press tool 162 may be adjusted based on the position of the platform 150 relative to the base 148. That is, as the guide rail 152 moves laterally within the track 156 of the base, the lateral position of the press tool 162 also moves. The weight press device 122 may thus allow for lateral adjustment of the press tool 162. During operation, the weight press device 122 may rotate about the wrist 118 so that the press tool 162 may rotate and apply force along the inside of the wheel in order to secure the weights to the wheel.

At least one stop 164 may be arranged on the base 148. In the example shown in FIGS. 2 and 3, a pair of stops pins 164 are arranged on each side of the base 148. The guide pins 164 are configured to be received by the notches defined by the platform 150. The guide pins 164 are configured to prevent the platform 150 from moving too far in one direction. In the example of FIGS. 2 and 3, the guide pins 164 are arranged at the back of the notches since the platform 150 is in a rest or default position with respect to the base 148. The notches may form at least one projection 165 configured to abut the guide pins 164 at the proximal end of the press device 122. The guide pins 164 may act as a stop block, configured to prevent the platform 150 from extending past a certain lateral position. While a pair of notches, or projections 165, are illustrated, a single stop block with a single projection 165 may be provided. More than a pair of each may also be possible. Additionally or alternatively, the stop 164 may be arrange at other portions of the tool 122, such as the platform, rail, etc. The projection 165 and/or the stop 164 may form a bumper or other type of motion limiting feature.

The weight press device 122 may include a sensing system 170 configured to detect a displacement of the platform 150 relative to the base 148. The displacement may indicate the placement of the press tool 162 which is displaced with the platform 150. The sensing system 170 may include at least one sensor 172 arranged at a proximal end of the platform 150 and a sensor plate 174.

The sensor 172 may be a camera, or other form of visual sensor, including but not limited to a colorimeter, image sensor, optical sensor, LED sensor, fiber optic sensor, photodetector, photodiode, photo switch, photodetector, light potentiometric sensor, etc.

The sensor plate 174 may be disposed on one side of the base 148 and fixed thereto. The sensor plate 174 may include reference marking that differs along its length. The sensor 172 may be configured to acquire an image of a portion of the sensor plate 174. The image may include a portion of the reference marking, which in turn may be indicative of a location along the sensor plate 174. The controller 130 may receive the image and determine a displacement associated with this reference marking and thus determine the displacement of the platform 150 and the press tool 162. The controller 130 may subsequently determine a force associated with the displacement. Once a predetermined displacement or force is reached, the controller 130 may instruct the platform 150 to maintain its current position and instruct the wrist 118 to rotate.

The weight press device 122 may include a biasing member 178 configured to attach to each the platform 150 and the base 148. The biasing member 178 may be a spring, bungie, elastic member, etc. The spring 178 may be configured to be preloaded to aid in maintaining the platform 150 in the resting position. Such preloading may be aided by projections' interaction with the guide pins 164. The guide pins 164 may be any motion limiting blocks or features. In the resting position, the guide pins 164 may abut the projections 165 and maintain the spring in a preloaded state. The resting state/position may be maintained until a force is realized at the press tool 162. The spring may be an extension spring, a compression spring, air spring, etc. While the spring is illustrated as being offset at an angle between the platform 150 and the base 148, the biasing member 178 may also be parallel to the platform 150 and base 148. In this situation, the spring 178 would may at least resist force in the direction of the platform. The spring may provide for a variable force as the spring is compressed or extended.

The biasing member 178 may be connected to the platform 150 and the base 148 by prongs 180 arranged thereon, as well as on the platform 150. The prongs 180 may include eye-hooks, or other attachment mechanisms.

The platform 150 of the weight press device 122 may rest in a fully extended position with respect to the base 148. As explain, the rest position may be the normal position of the tool 122 when not in use. During use, however, the press tool 162 may come into contact with the inside of the wheel. The press tool 162 may rotate along the inside radius to press weights onto the wheel. This may allow the platform 150 to realize an inward force.

Figure 4:
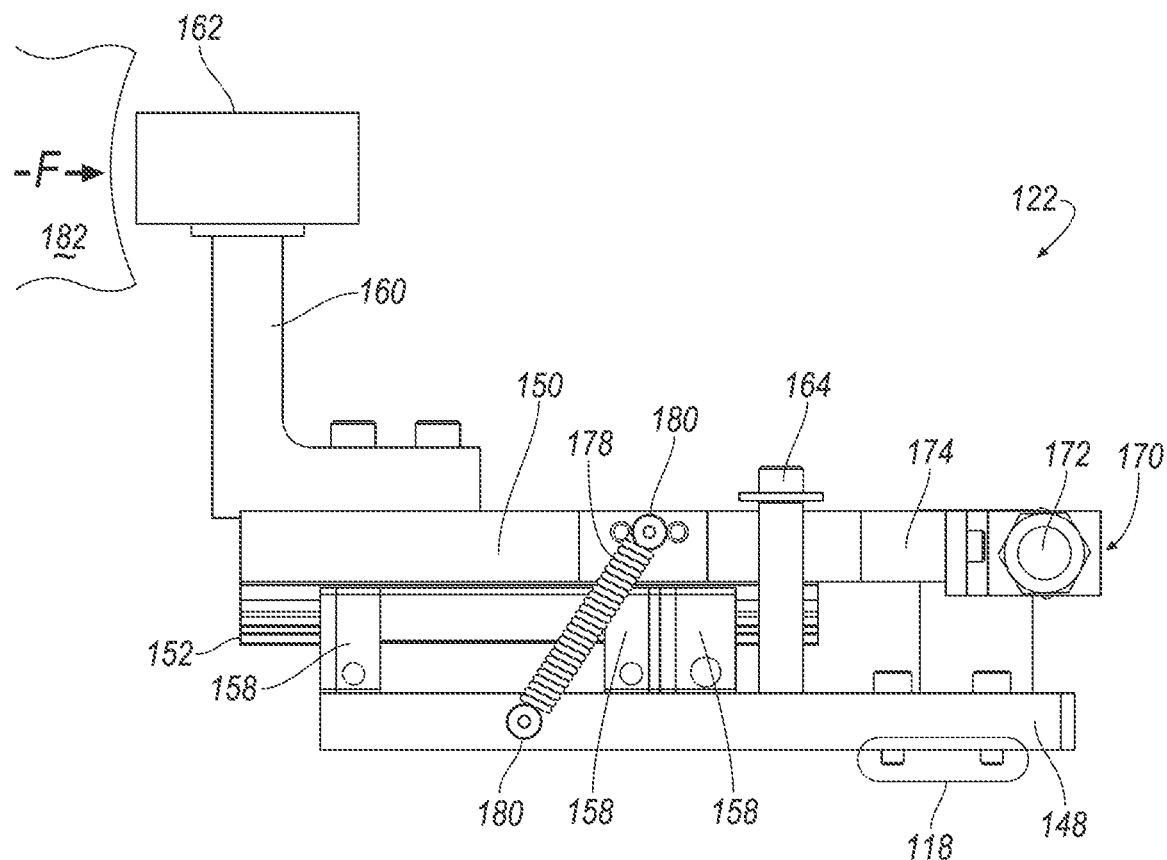
FIG. 4 illustrates a side view of the weight press tool of FIG. 1, the weight press tool being in a partially extended state.
Figure 5:
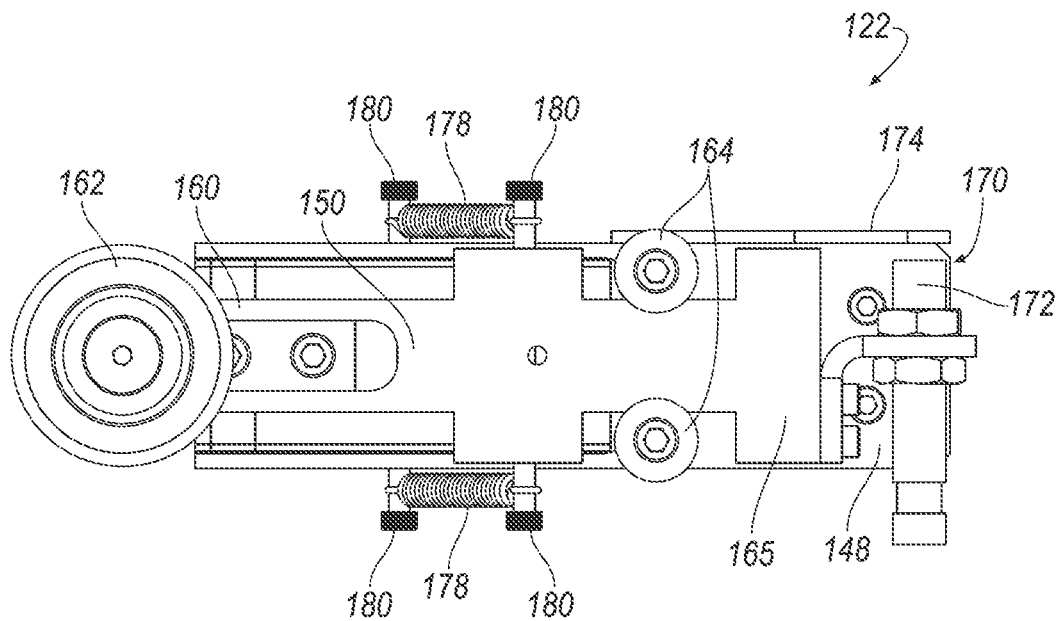
FIG. 5 illustrates a top view of the same position of the weight press tool as FIG. 4.

FIG. 4 illustrates a side view of the weight press device 122 of FIG. 1, the weight press tool being in a partially extended state. FIG. 5 illustrates a top view of the same position of the weight press tool as FIG. 4. In this example, the press tool 162 may come into contact with an inside of a wheel 182. The wrist 118 and arm 120 of the weight press system 100 (as shown in FIG. 1), may align the press tool 162 with the wheel and rotate the weight press device 122 such that the press tool 162 is rolled around the inside of the wheel 182. The weight press device 122 may exert an appropriate amount of force on the wheel in order to affectively affix and adhere the weights to the wheel during rolling. Conversely, the platform 150 of the weight tool 112 may move inwardly in response to the press tool 162 coming into contact with the weight on the wheel 182. That is, as the press tool 162 abuts the inside of the wheel 182, the platform 150 may retract along the guide rail 152 towards the proximal end of the base 148.

The spring compression (or expansion) may determine the force applied by the press tool 162. The displacement or translation of the platform 150 with respect to the base 148 may determine the compression (or expansion) and thus the force. The controller 130 may determine the appropriate displacement based on calibration and customer supplied specifications for the specific wheel 182. In one example, the force may be approximately 50 Newtons at a displacement of 10 mm.

During operation, the press tool 162 may rotate along the inside radius of the wheel 182 and intermittingly come into contact with a weight arranged on the wheel 182. The weights may not be continuously disposed about the wheel and thus, as the press tool 162 extends around the wheel 182, the press tool 162 alternates between coming into contact with the wheel and the weights. When in contact with the weights, the platform 150 allows for a slight movement or give in the displacement of the platform 150 with respect to the base 148 to accommodate the bump, or protrusion created by the weights, where present.

The wheel 182 creates a counterforce indicated by the arrow F at the press tool 162. This counterforce may adjust the displacement of the platform 150 respective to the base 148. As the force F is applied to the press tool 162, the platform 150 is moved from a fully extended rest position laterally inward to a partially extended position. The biasing member 178 is further extended to accommodate the translation of the platform 150 relative to the base 148. Furthermore, as the platform 150 translates, the notch defined by the platform 150 does as well. This may cause the guide pins 164 to be arranged within the center, or near center of the notches of the platform 150, and not at an end of the notches, as shown in FIG. 5.

Figure 6:
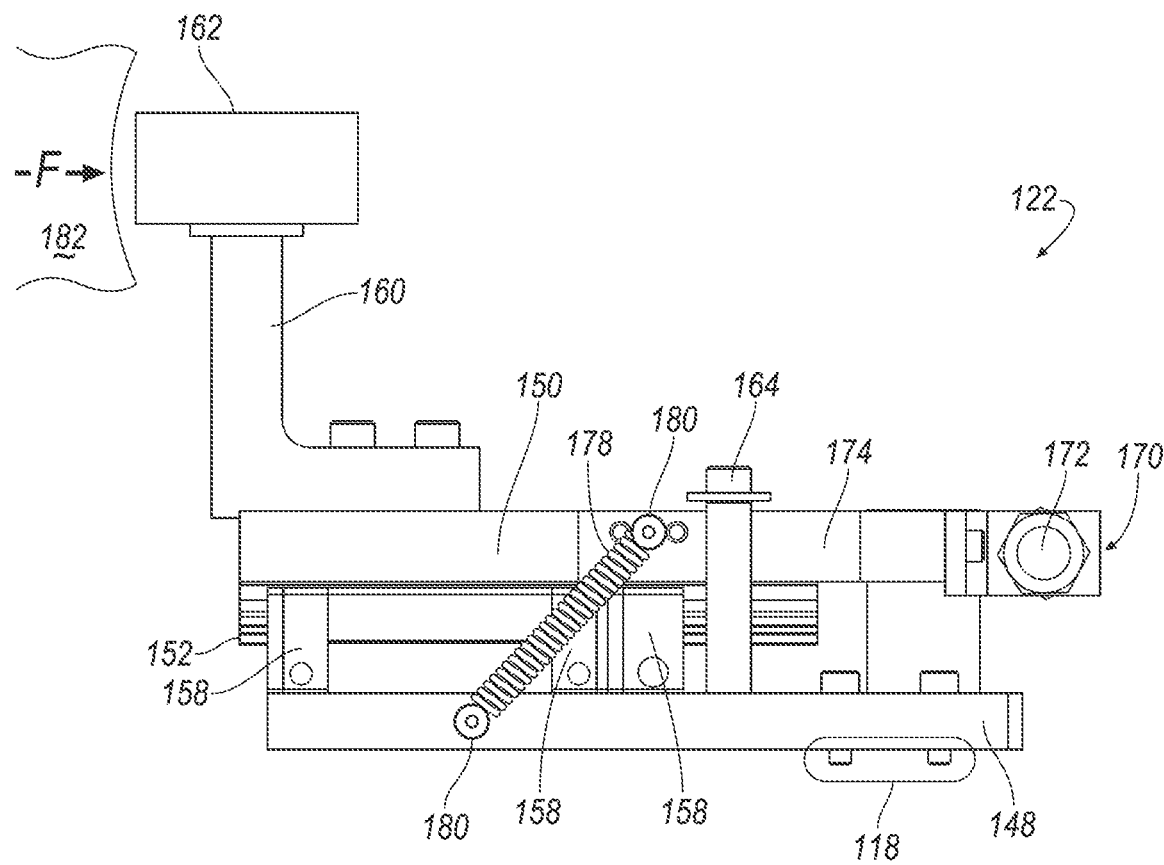
FIG. 6 illustrates a side view of the weight press tool of FIG. 1, the weight press tool being in a partially extended state.
Figure 7:
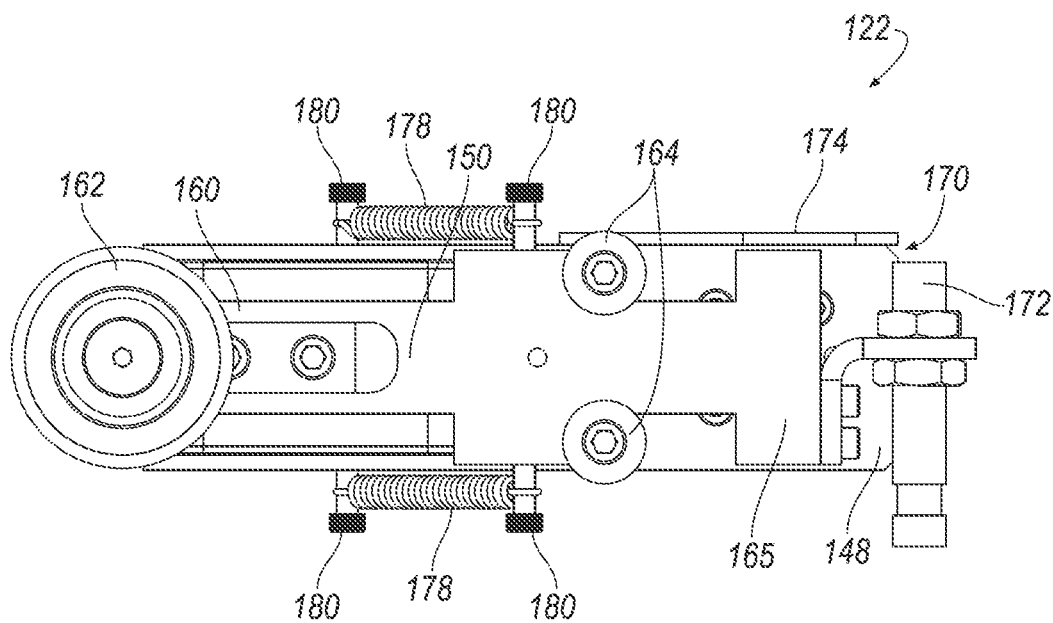
FIG. 7 illustrates a top view of the same position of the weight press tool as FIG. 6.

FIG. 6 illustrates a side view of the weight press device 122 of FIG. 1, the weight press tool being in a fully retracted state. FIG. 7 illustrates a top view of the same position of the weight press tool as FIG. 6. In this state, the weigh press device 122 has hit its maximum travel distance. The guide pins 164 may abut the projections 165 of the platform 150. The extension spring 178 may be fully, or near fully extended. Although not shown in the figures as a compression spring, in the example of a compression spring, the spring may be fully, or near fully, compressed. The platform 150 may be translated along the guide rail 152 such that the guide rail 152 is almost entirely received by the track 156. The sensor 172 may extend past the sensor plate 174 and may transmit a message to the controller 130 indicating such.

To reiterate, in FIGS. 2 and 3, the sensor plate 174 may be aligned with the sensor 172 and the sensor 172 may transmit an image to the controller 130 indicating such.

In the example of FIGS. 4 and 5, the sensor plate 174 may be partially aligned with the sensor 172. The controller 130 may determine, based on the image or data received from the sensor 172 the platforms' position with respect to the base 148. This position may indicate the translation of the press tool 162.

In the example shown in FIGS. 6 and 7, the sensor 172 may be entirely unaligned with the sensor plate 174. The controller 130 may receive an image that indicates this and thus determine that the platform 150 is in a retracted state. Thus, the controller 130 may use sensor data to determine a displacement, as well as a force associated therewith to control the weight press device 122.

The controller 130 may receive an indication of a distance, which correlates to a force. The controller 130 may instruct the robot to maintain a minimum force level. The controller 130 may instruct the robot to maintain the force along the predefined path. Should the force fall outside of the predefined force range, the robot may adjust the predefined path accordingly.

Figure 8:
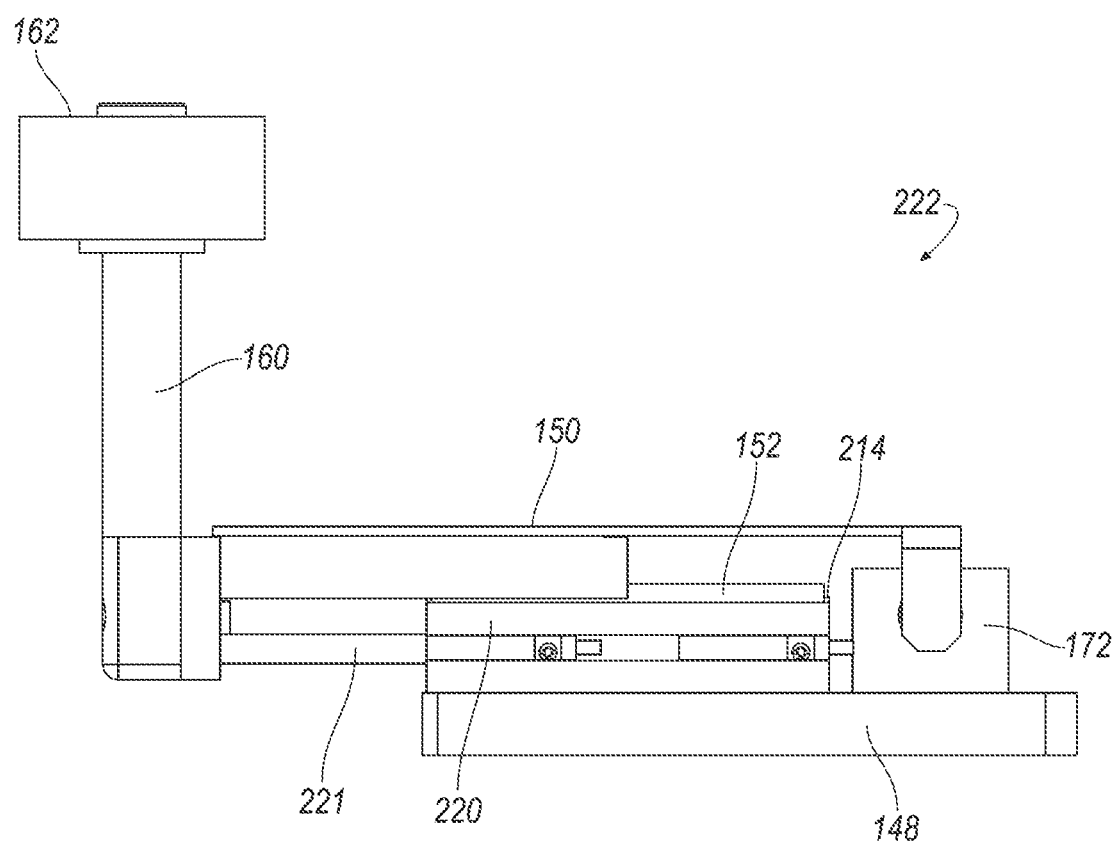
FIG. 8 illustrates a side view of another example weight press tool of FIG. 1, the weight press tool being in an extended state.
Figure 9:
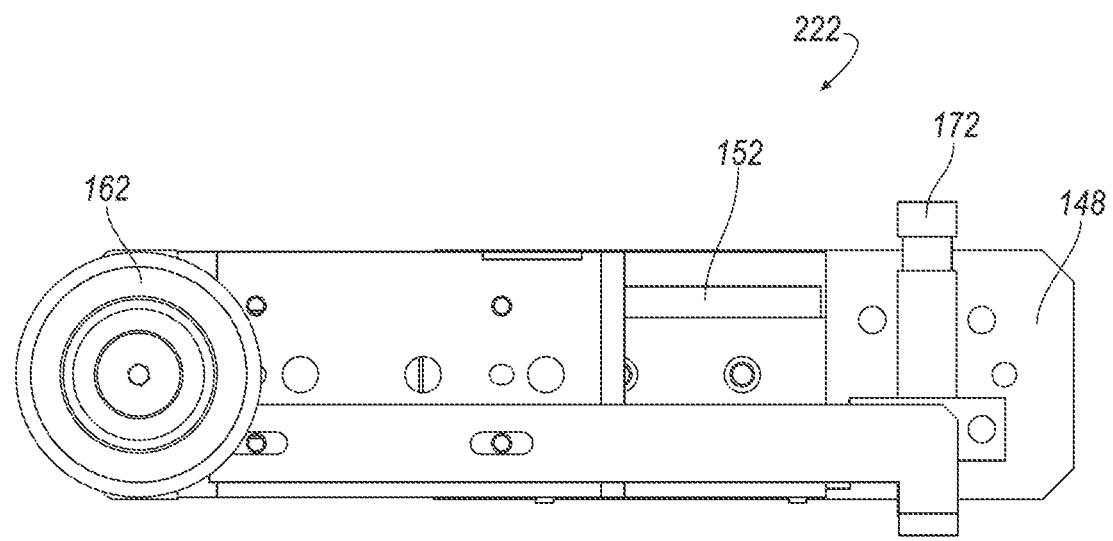
FIG. 9 illustrates a top view of the weight press tool of FIG. 8.

FIG. 8 illustrates a side view of another example weight press tool 222 of FIG. 1. FIG. 9 illustrates a top view of the weight press tool of FIG. 8. In this example, the weight press tool 222 may include a pneumatic cylinder 220 configured to translate the press tool 162 with respect to the base 148. The support element 160 may be fixed to a piston rod 221 of the pneumatic cylinder 220. The piston rod 221 may be configured to move laterally with respect to the base 148. The piston 221, as shown in FIG. 8, may be fully extended in a resting position. The pneumatic cylinder 220 may maintain a certain pressure there within in the resting position. As the press tool 162 is forced inward, the pressure within the cylinder 221 may increase. the platform 150. The controller 130 may instruct the cylinder 220 to translate the platform 150.

A guide 152 or support cylinder may be arranged proximate to the cylinder 220 to provide structure and support for the cylinder to prevent any unnecessary axial or rotational movement of the cylinder 20. The guide 152 may be a guiding cylinder. In examples where a pair of pneumatic cylinders 220 are included, a guide 152 may not be necessary.

The weight press tool 222 may include the sensor 172 arranged on the base 148. The sensor 172 may be any type of sensor capable of delivering data indicative of force. In this example, the sensor 172 may be a distance sensor. A pressure sensor 214 may also be included to provide a pressure of the cylinder 220. The pressure sensor 214 may id in maintaining a constant pressure, and therefore providing a constant force. These sensors are no mutually exclusive and one or both may be included or omitted. Additionally or alternatively, a magnetic sensor (not individually labeled) may be included and configured to determine the translation of the piston rod 221. The pneumatic cylinder 220 may provide for a constant application of force with respect to the translation. That is, the resistance provided by the pneumatic cylinder 220, unlike the example of the spring 178 set forth above, may not vary with translation of the roller, but remain constant.

Figure 10:
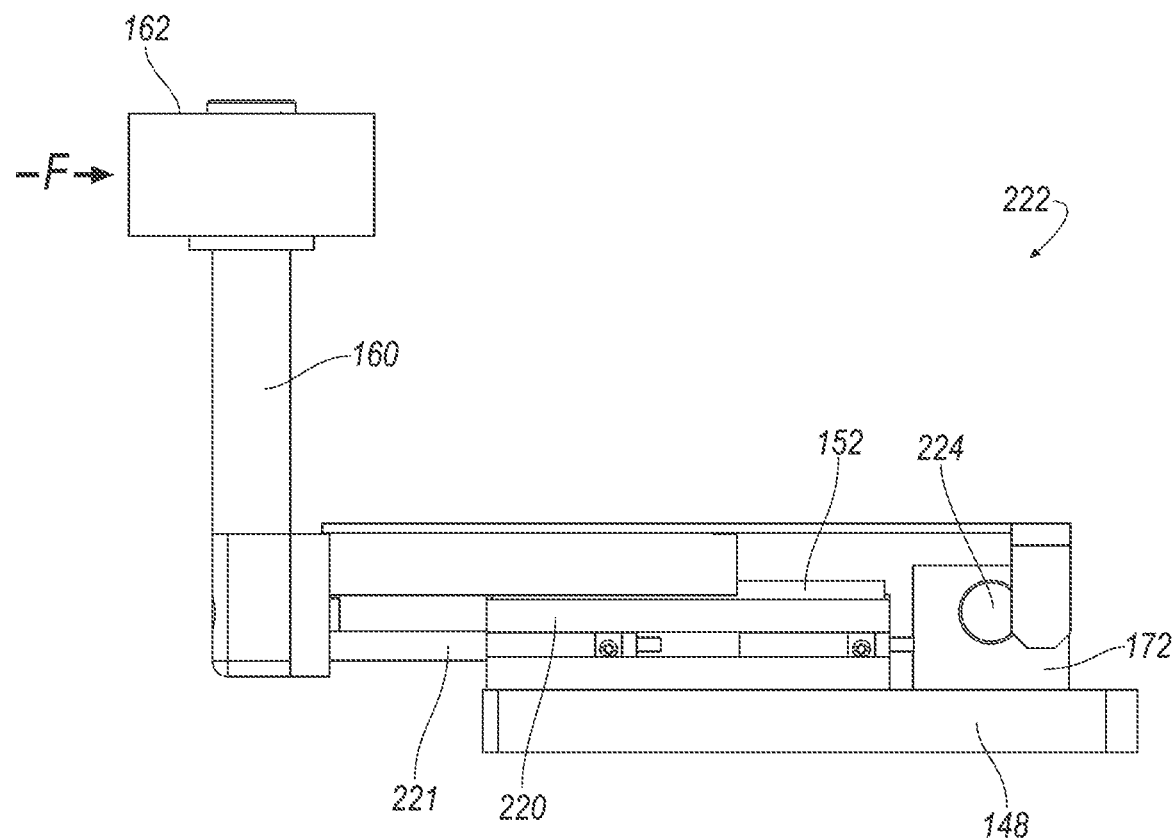
FIG. 10 illustrates a side view of another example weight press tool of FIG. 1, the weight press tool being in a partially extended state.
Figure 11:
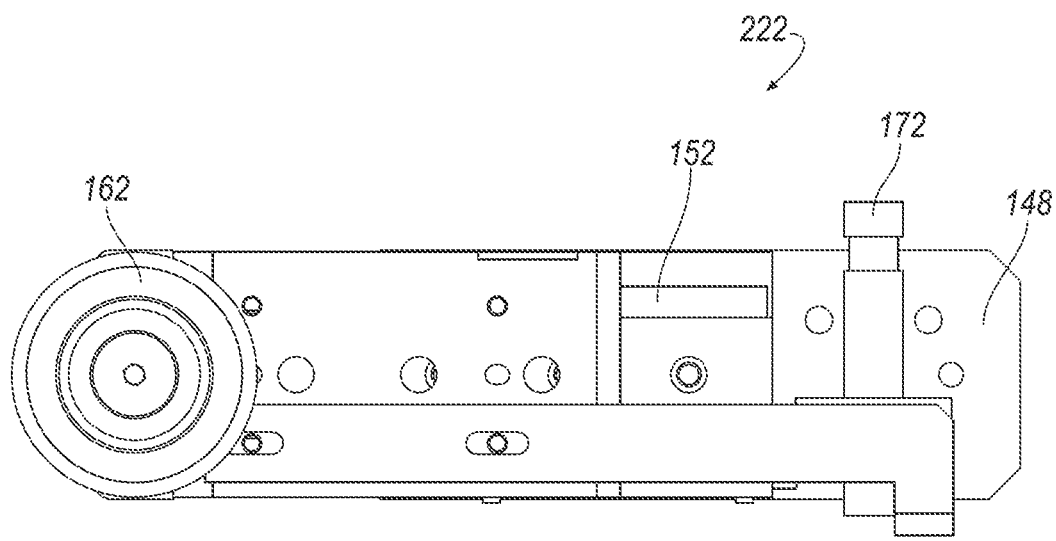
FIG. 11 illustrates a top view of the weight press tool of FIG. 10.
Figure 12:
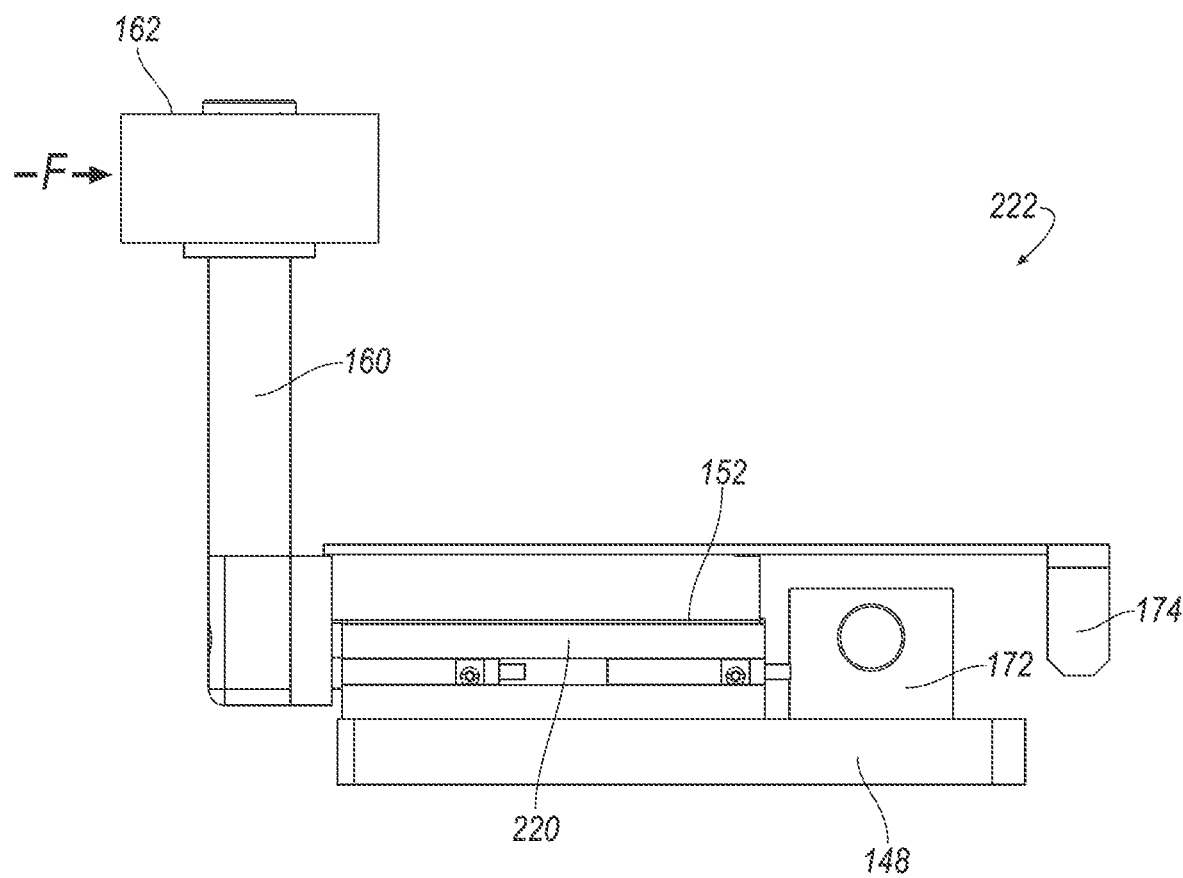
FIG. 12 illustrates a side view of another example weight press tool of FIG. 1, the weight press tool being in a retracted state.
Figure 13:
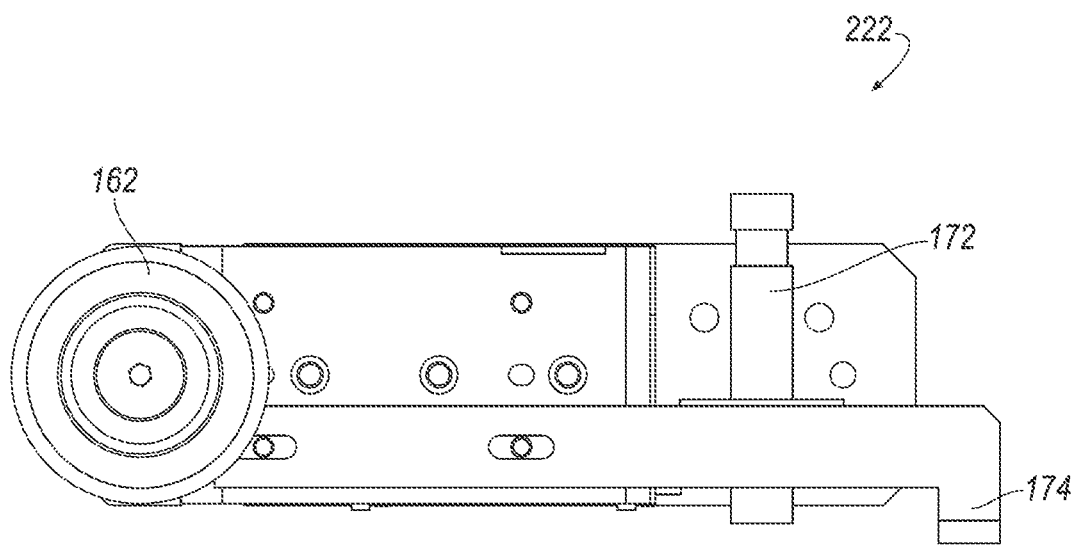
FIG. 13 illustrates a top view of the weight press tool of FIG. 12.

FIG. 10 illustrates a side view of the example weight press tool 222 of FIG. 1. FIG. 11 illustrates a top view of the weight press tool of FIG. 10. In this example, similar to the examples of FIGS. 4 and 5 above, the platform 150 is in a partially extended state. The controller 130 may then determine that based on this image and the alignment, that the platform 150 is in a fully extended state.

Figure 14:
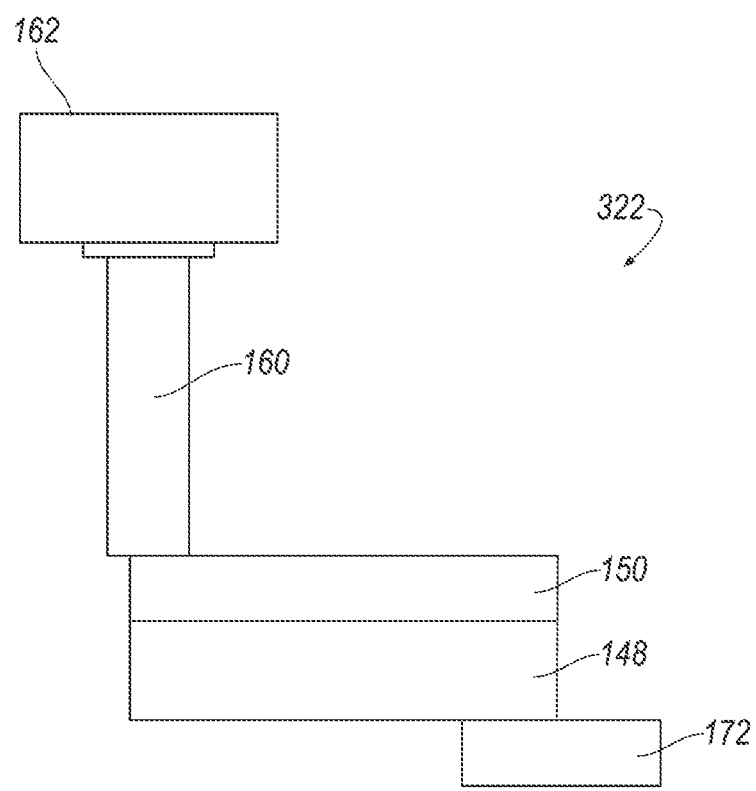
FIG. 14 illustrates a side view of another example weight press tool of FIG. 1.

FIG. 14 illustrates an example tool 322 with the sensor 172. In the example of FIG. 14, the sensor 172 may be a force sensor arranged at the base 148 and configured to detect the amount of force being applied at the press tool 162. The force sensor may transmit the force data back to the controller 130.

The embodiments of the present disclosure generally provide for a plurality of circuits, electrical devices, and at least one controller. All references to the circuits, the at least one controller, and other electrical devices and the functionality provided by each, are not intended to be limited to encompassing only what is illustrated and described herein. While particular labels may be assigned to the various circuit(s), controller(s) and other electrical devices disclosed, such labels are not intended to limit the scope of operation for the various circuit(s), controller(s) and other electrical devices. Such circuit(s), controller(s) and other electrical devices may be combined with each other and/or separated in any manner based on the particular type of electrical implementation that is desired.

It is recognized that any controller as disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any controller as disclosed utilizes any one or more microprocessors to execute a computer-program that is embodied in a non-transitory computer readable medium that is programmed to perform any number of the functions as disclosed. Further, any controller as provided herein includes a housing and the various number of microprocessors, integrated circuits, and memory devices ((e.g., FLASH, random access memory (RAM), read only memory (ROM), electrically programmable read only memory (EPROM), electrically erasable programmable read only memory (EEPROM)) positioned within the housing. The controller(s) as disclosed also include hardware based inputs and outputs for receiving and transmitting data, respectively from and to other hardware based devices as discussed herein.

With regard to the processes, systems, methods, heuristics, etc., described herein, it should be understood that, although the steps of such processes, etc., have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A robotic weight press assembly configured to press weights to a wheel, comprising:
   a selectively moveable arm that is operatively connected to a body portion at a first end thereof; and
   a weight press tool operatively connected to a second end of the moveable arm;
   wherein the weight press tool includes at least one mounting bracket maintaining the press tool thereon, the mounting bracket arranged on a platform, and a base operatively connected to the second end of the arm, the platform being slidably fixed to the base in order to adjust the lateral displacement of the press tool, and wherein the press tool is configured to apply force at the wheel,
   at least one stop arranged on the base, wherein the platform includes at least one guide rail configured to be received by a track of the base, the platform including at least one projection formed by a notch defined by the platform and configured to abut the at least one stop, the notch maintaining the stop therein to prevent over translation of the platform with respect to the base.

2. The robotic weight press assembly of claim 1, wherein the arm is configured to move the weight press tool along a predefined path along the wheel.

3. The robotic weight press assembly of claim 2, wherein the predefined path includes an area along an inside area of the wheel configured to maintain at least one weight on the wheel.

4. The robotic weight press assembly of claim 1, further comprising at least one biasing member connected to each of the platform and the base.

5. The robotic weight press assembly of claim 4, wherein the stop abuts a distal end of the notch to preload the biasing member in a resting position.

6. The robotic weight press assembly of claim 1, further comprising a sensing system arranged on the weight press tool and configured to provide sensing data to a controller, the sensing data indicative of a force applied by the press tool at the wheel.

7. The robotic weight press assembly of claim 6, wherein the sensing system includes at least one sensor.

8. The robotic weight press assembly of claim 6, wherein the sensing system includes at least one sensing plate including a reference marker configured to indicate a translation of the arm with respect to the base.

9. A robotic weight press assembly configured to press weights to a wheel, comprising:
   a selectively moveable arm that is operatively connected to a body portion at a first end thereof;
   a weight press tool operatively connected to a second end of the moveable arm;
   wherein the weight press tool includes at least one mounting bracket maintaining the press tool thereon, the mounting bracket arranged on a platform, and a base operatively connected to the second end of the arm, the platform being slidably fixed to the base in order to adjust the lateral displacement of the press tool, and wherein the press tool is configured to apply force at the wheel, and
   a sensing system arranged on the weight press tool and configured to provide sensing data to a controller, the sensing data indicative of a force applied by the press tool at the wheel, wherein the sensing system includes at least one sensing plate including a reference marker configured to indicate a translation of the arm with respect to the base.

10. A robotic weight press assembly configured to press weights to a wheel, comprising:
    a selectively moveable arm that is operatively connected to a body portion at a first end thereof;
    a weight press tool operatively connected to a second end of the moveable arm;
    wherein the weight press tool includes at least one mounting bracket maintaining the press tool thereon, the mounting bracket arranged on a platform, and a base operatively connected to the second end of the arm, the platform being slidably fixed to the base in order to adjust the lateral displacement of the press tool, and wherein the press tool is configured to apply force at the wheel, and
    at least one biasing member connected to each of the platform and the base.

11. The robotic weight press assembly of claim 10, wherein the arm is configured to move the weight press tool along a predefined path along the wheel and wherein the predefined path includes an area along an inside area of the wheel configured to maintain at least one weight on the wheel.

12. The robotic weight press assembly of claim 10, wherein the platform includes at least one guide rail configured to be received by a track of the base.

13. The robotic weight press assembly of claim 10, further comprising at least one stop arranged on the base.

14. The robotic weight press assembly of claim 13 wherein the platform includes at least one projection configured to abut the at least one stop.

15. The robotic weight press assembly of claim 14, wherein the at least one projection is formed by a notch defined by the platform.

16. The robotic weight press assembly of claim 15, wherein the stop abuts a distal end of the notch to preload the biasing member in a resting position.

17. The robotic weight press assembly of claim 16, wherein the notch defines a projection on each end thereof to maintain the stop within the notch and prevent over translation of the platform with respect to the base.

18. The robotic weight press assembly of claim 10, further comprising a sensing system arranged on the weight press tool and configured to provide sensing data to a controller, the sensing data indicative of a force applied by the press tool at the wheel.

19. The robotic weight press assembly of claim 18, wherein the sensing system includes at least one sensing plate including a reference marker configured to indicate a translation of the arm with respect to the base.

* * * * *